March 15, 1927.  A. RUSSO  1,621,134
NIPPLE
Filed Feb. 3, 1926
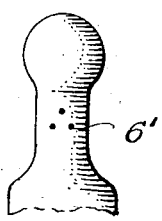
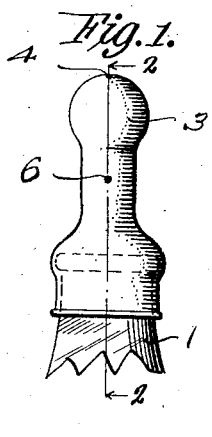
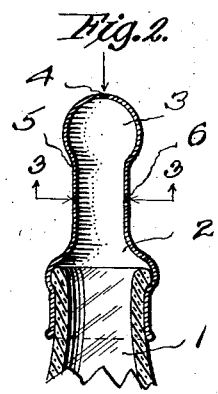
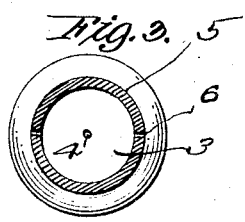
INVENTOR.
ALBERT RUSSO
BY
ATTORNEY.

Patented Mar. 15, 1927.

1,621,134

UNITED STATES PATENT OFFICE.

ALBERT RUSSO, OF PITTSTON, PENNSYLVANIA.

NIPPLE.

Application filed February 3, 1926. Serial No. 85,764.

This invention relates to nipples and has for its object the production of a simple and efficient nursing nipple which is adapted to be attached to a nursing bottle and is provided with means for permitting the entrance of air into the nipple so as to prevent the nipple from becoming collapsed, thereby necessitating the removal of the nipple from the bottle in order to permit the entrance of air and permit the nipple to assume its normal position.

Another object of this invention is the production of a very simple and efficient nipple which is provided with air vents formed in the sides thereof below the discharge end of the nipple, for the purpose of permitting air to enter the nipple and in this way prevent the collapsing of the nipple while an infant is sucking milk therethrough.

Other objects and advantages of the present invention will appear throughout the following specification and claim.

In the drawings:

Figure 1 is a side elevation of the nipple shown attached to a portion of the neck of a bottle.

Figure 2 is a vertical section taken on line 2—2 of Figure 1,

Figure 3 is a section taken on line 3—3 of Figure 2, and

Figure 4 is a side elevation of a modified form of the invention.

By referring to the drawing it will be seen that 1 designates the neck of the usual type of nursing bottle upon which the nipple 2 is adapted to fit in the usual manner by it fitting over the outer edge of the neck 1 of the bottle. The nipple 2 is provided with the usual sucking knob 3 having a discharge aperture 4 formed at its outer extremity for the purpose of permitting liquid such as milk and the like to pass readily through the nipple when sucked upon by the infant. The nipple 2 is provided with vertical side walls 5, within which side walls 5 are formed very fine air vent apertures 6. These apertures 6 being preferably formed diametrically opposite each other as clearly illustrated in Figure 2 of the drawing. These vent apertures 6 are preferably of the pin-hole type and are only of sufficient size to permit the entrance of air into the nipple in order to prevent the nipple from collapsing and at the same time prevent an excess entrance of air with the milk which would be likely to cause stomach disorders for the infant. In practical operation it is usual that the entire length of the nipple projecting beyond the neck 1 of the bottle will be in the mouth of the infant thereby practically sealing the side vent apertures 6 against the entrance of air, but should the nipple collapse, the infant will naturally remove the nipple from its mouth and the entrance of air through the air vents 6 will cause the nipple to again assume its natural and normal expanded position.

From the foregoing description it will be seen that a very simple and efficient device has been produced in the nature of a nursing nipple for attachment to a nursing bottle which will overcome the necessity of removing the nipple from the bottle in order to permit the nipple to assume its normal position after once having collapsed. The formation of the air vents will eliminate this necessity and will assist in holding the nipple in its proper and normal extended position.

In Figure 4 I have shown a modified form of the invention wherein a plurality of apertures 6' are employed for the purpose of permitting the entrance of air into the nipple. These apertures are normally closed by the lips of the infant while sucking the nipple and will prevent the entrance of air during this operation.

Having described the invention, what is claimed is:

As a new article of manufacture, a nipple comprising an enlarged cylindrical attaching portion adapted to fit over the neck of a bottle, a reduced cylindrical neck formed integral with the attaching portion, and a rounded knob formed integral with said neck, said knob being provided with a discharge aperture at its outer end and the reduced cylindrical neck being also provided with a plurality of diametrically disposed minutely formed air vents.

In testimony whereof I affix my signature.

ALBERT RUSSO.